(12) United States Patent
Monti

(10) Patent No.: US 7,455,168 B2
(45) Date of Patent: Nov. 25, 2008

(54) DYNAMIC TEMPORARY ARTICLE STORING DEVICE, FOR EXAMPLE FOR SYRINGES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 118 days.

(21) Appl. No.: 11/690,224

(22) Filed: Mar. 23, 2007

(65) Prior Publication Data

US 2007/0221478 A1 Sep. 27, 2007

(30) Foreign Application Priority Data

Mar. 24, 2006 (IT) .......................... BO2006A0210

(51) Int. Cl.
*B65G 1/12* (2006.01)

(52) U.S. Cl. .............. 198/347.1; 198/419.3; 198/460.1; 198/460.2; 198/461.3

(58) Field of Classification Search .............. 198/347.1, 198/347.4, 459.8, 460.1, 460.2, 461.3, 419.2, 198/419.3, 418.7
See application file for complete search history.

(56) References Cited

U.S. PATENT DOCUMENTS

| | | | | |
|---|---|---|---|---|
| 2,932,376 A | * | 4/1960 | Millington | 198/341.03 |
| 4,413,724 A | * | 11/1983 | Fellner | 198/594 |
| 4,565,284 A | * | 1/1986 | Seragnoli et al. | 198/792 |
| 4,751,996 A | * | 6/1988 | Knecht | 198/347.1 |
| 6,913,135 B2 | * | 7/2005 | Borderi et al. | 198/460.2 |
| 2003/0234601 A1 | | 12/2003 | Spettl | |
| 2006/0052196 A1 | | 3/2006 | Gelli et al. | |

FOREIGN PATENT DOCUMENTS

DE 4228868 A 6/1993

OTHER PUBLICATIONS

International Search Report.

* cited by examiner

*Primary Examiner*—Mark A Deuble
(74) *Attorney, Agent, or Firm*—William J. Sapone; Coleman Sudol Sapone P.C.

(57) ABSTRACT

A dynamic temporary storing device for articles like syringes and similar articles is situated between an outlet of a first machine and an inlet of a second machine. In the dynamic temporary storing device, two pairs of side-by-side belts transfer articles from an outlet of said first machine downstream to an inlet section of an article conveying path. The articles are gathered, one after another, to form groups of articles in the inlet section. The conveying path ends with an article outlet section situated near the inlet of the second machine. Driving means are associated to the conveying path and pass at adjustable time intervals through the inlet section so as to pick up said groups of articles and move them along the conveying path up to the outlet section. Then the groups of articles are transferred them to the inlet of said second machine. Changes in operation rate of the second machine are compensated by changing the number of articles in each group or by changing the length of the conveying path.

16 Claims, 3 Drawing Sheets

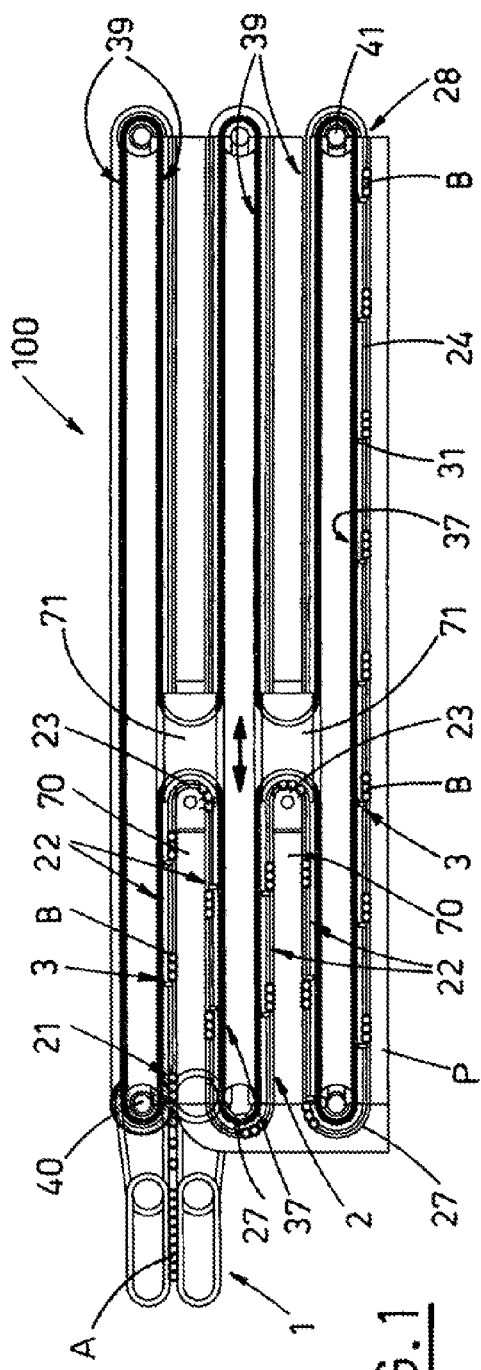
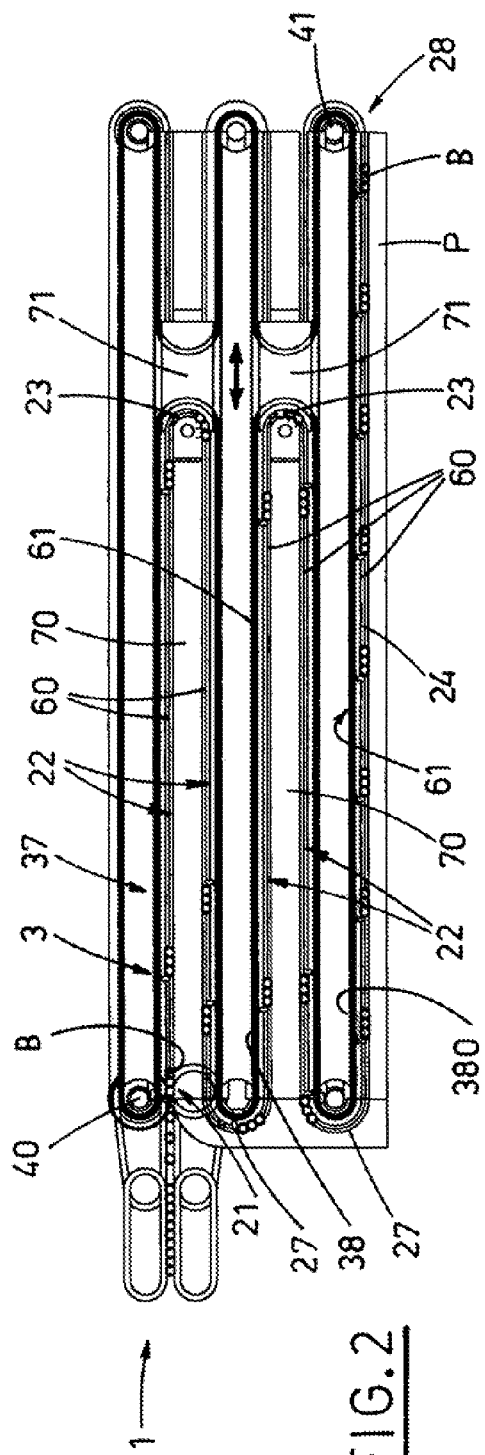
FIG.1
FIG.2

DYNAMIC TEMPORARY ARTICLE STORING DEVICE, FOR EXAMPLE FOR SYRINGES

FIELD OF THE INVENTION

The present invention relates to automatic production lines for manufacturing a series of articles and for subsequent packaging thereof into containers or packages.

More in detail, the present invention relates to a dynamic temporary storing of articles, in particular articles having a tubular shape such as syringes. The temporary storing device is intended to be positioned between the outlet of a first machine, e.g. the production machine, and the inlet of a second machine, usually a packaging machine.

BACKGROUND OF THE INVENTION

Generally, machines working in line, such as the ones just mentioned, have different operation rates, and particularly, the downstream machines operate faster than the machines situated upstream, to prevent hindrance to operation of the upstream machines and to provide a wider rage of variation in the processing rate of the product flow, for the reasons which will be explained in the following.

The machines are connected to one another by product conveyors, which in the case of the syringes, and similar articles, consist of downwards sloping tracks, along which the products slide to the next machine. The products are raised to the inlet of the sloping conveyors by suitable lifters, or by placing the machines at different levels.

In this operational context, product flow can be affected by short interventions made by the operator, for instance to replace an empty reel or band with a new one on the packaging machine, or to remove slightly jammed articles, or by longer stopping of the packaging machine, such as when the jammed products require a longer time to be removed or a most critical operation problem has occurred.

In the first case, shorter stop time, the articles accumulate along the sloping tracks of the conveyors, then when the packaging machine resumes operation, they are processed at a higher rate, so as to take a short time for the product flow to return to its regular condition.

To cope with the second case, longer stop time, temporary storing devices are placed along the conveyor, with the aim of storing a larger number of articles, to keep the upstream production rate unchanged for a longer time. Also in this case, the packaging machine operation is resumed, after the problem has been removed, at a higher rate, to empty the temporary storage device.

In case the temporary storage device gets full before the packaging machine operation is resumed, the facility must be generally stopped.

Also the known temporary storage devices, in case of syringes or similar articles, include sloping track sections carried by a rotary cylinder, also sloping. Once one track section is full with articles, the cylinder is rotated one step and a new track section is aligned with the sloping conveyor to be filled, and so on. Conversely, when operation is resumed, the cylinder is rotated one step when the currently available track section is empty, until all sections are emptied.

Accordingly, along the terminal section of the tracks the articles accumulate in a close reciprocal contact, and are then transferred to the inlet of the second machine either singly or in groups.

If this is acceptable for short rows of articles in normal operation condition, when a stop occurs for the packaging machine the row of articles becomes too long. Due to the sloping, the foremost articles are subjected to particularly urging force, so that they can become damaged, thus requiring removal of defective packages or causing new jamming later on, when operation is resumed. It should be considered that the sloping tracks may extend some meters, just for making available a suitable length of track for storing the articles during these short stops.

The same happens in the temporary storage device, which also may extend some meters in the longitudinal direction to allow sufficient room for the articles.

SUMMARY OF THE INVENTION

The object of the present invention is to propose a dynamic temporary storing device for articles, e.g. syringes and similar ones, in which the articles are not gathered along sloping tracks, so that highly urging forces acting on the foremost articles are avoided while offering large storing room for the articles.

In particular, it is an object of the present invention to propose a dynamic temporary storage device, which replaces the old type storing device for syringes and the like articles, so that in case of a long time stop of the downstream machine, the articles are not gathered in long sloping tracks, all urging against the foremost articles, possibly causing damages thereto.

Another object of the invention is to propose a temporary storage device equipped with means capable of suspending the feeding of articles to the downstream machine for a short time, necessary to replace an empty band reel or similar quick operation, without affecting the operation rate of the upstream machine.

In general, the object of the invention is to supply a temporary storage device which allows avoiding very long sloping conveyors for the articles, because they are relieved from temporary storing task. This way, the sloping conveyors are mush shorter, and the row of articles gathered along them is not enough long to cause any damage thereto.

The temporary storing device of the invention is to be interposed between the outlet of a first machine and the inlet of a second machine, with interposition of short sloping conveyors, having a length amounting to some tens of centimeters, necessary only for connection purpose.

A further object of the present invention is to propose a dynamic temporary storing device, which is capable of supplying information concerning the number of articles present therein at a given moment.

The above mentioned objects are obtained in accordance with the contents of the claims.

BRIEF DESCRIPTION OF THE DRAWINGS

The characteristic features of the new dynamic temporary storing device for articles, for example syringes, proposed by the present invention, are described in the following with reference to the enclosed figures, in which:

FIGS. 1 and 2 are relevant top views of the dynamic temporary storing device, proposed by the invention, in respective distinct operative configurations;

DISCLOSURE OF THE PREFERRED EMBODIMENTS

Figure 3:
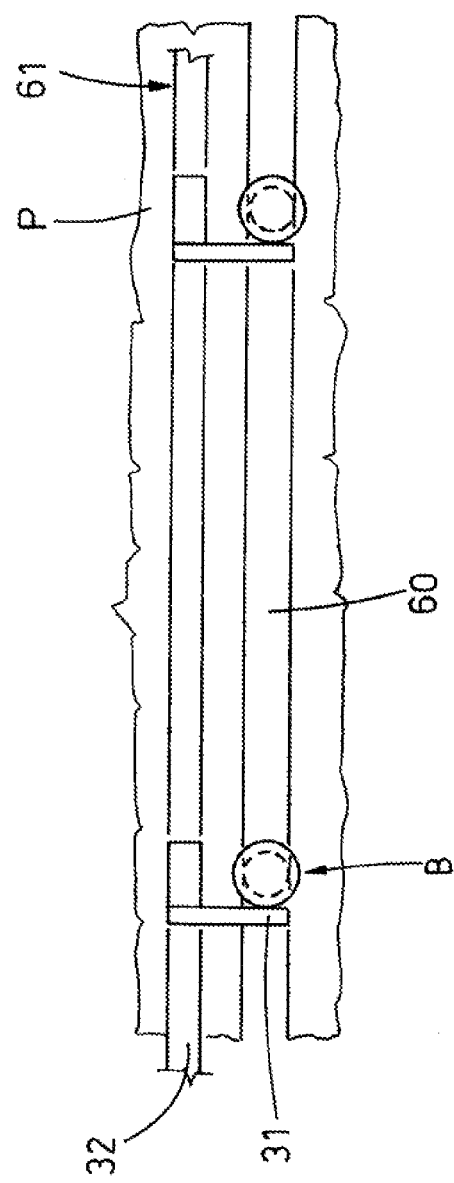
FIGS. 3 and 4 are partial top views, enlarged with respect to the FIGS. 1 and 2, of the significant elements of the dynamic temporary storing device in two typical operative configurations during the operation for transferring the articles.

With regards to the enclosed Figures, the reference numeral 100 generally indicates the dynamic temporary storing device for articles, for example syringes, proposed by the present invention.

It goes without saying that articles other than the syringes can be processed without departing from the scope of the invention.

The dynamic temporary storing device 100, proposed by the invention, is aimed at being positioned between an outlet of a first work machine, for example for producing articles, which is not shown and which usually includes a short sloping conveyor, and an inlet of a second work machine, for example for packaging the articles into relative packages, also not shown and including another sloping conveyors.

The sloping conveyors, the first one leading to a lower level at the temporary storing device inlet and the second leading to a lower level at the second work machine inlet, makes the articles go forward without the need of any drive.

It is to be emphasized that the length of the sloping conveyors is not such to cause any stress or damage to the foremost articles.

As usual, the second or downstream machine can operate at a faster operation rate than the first or upstream machine.

The dynamic temporary storing device 100 includes basically two parts, which cooperate together but are operated independently from each other.

In further detail, the first part operates for compensating short time stops of the second machine, in cooperation with the second part, while only the second part intervenes in case of long time stops.

In the first part, transferring means 1 take the articles A from the sloping conveyor connected to outlet of the first machine and transfer them to an inlet section 21 of the second part.

In the second part, a dynamically variable article conveying path 2 transfers the articles A, gathered in groups B, to the outlet section 28, where a second sloping conveyor takes the articles to the second machine.

According to a first, non-exclusive aspect of the invention, the transferring means 1 include a first pair of endless belts 11, which are arranged one beside the other on a common horizontal plane, and a second pair of endless belts 12, arranged one beside the other on a second common plane, after the first pair of belts 11, considering the article forward direction.

The terminal part of the belts of the second pair 12 faces the inlet section 21.

The belts of the first pair of belts 11, as well as of the second pair of belts 12, are set at such distance, as to receive therebetween the articles one after another, avoiding their falling due to gravity, and to transfer them downstream.

Figure 5:
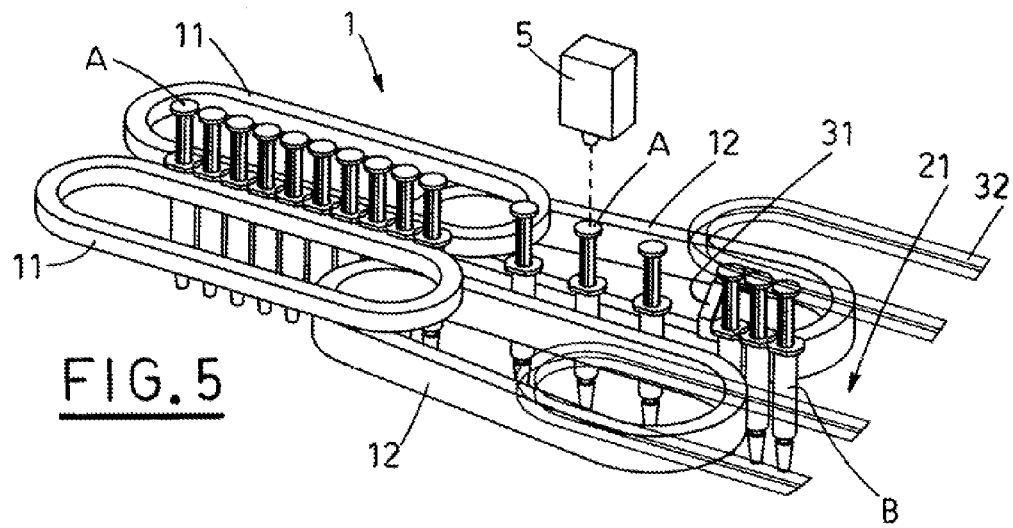
FIG. 5 is a partial perspective view, enlarged with respect to the FIGS. 1 and 2, of other significant elements of the dynamic temporary storing device, proposed by the invention.

The terminal part of the first pair of belts 11 overlaps the initial part of the second pair of belts 12 (as shown for example in FIG. 5), so that the articles A are transferred without any gap in their course.

The article transferring speed of the second pair of belts 12 is kept higher than the one of the first pair of belts 11, to offset the articles before they enter the inlet section 21 (see FIG. 5), in which they are gathered one after another, so as to form groups B of articles.

The offset motion of the articles allows detecting means 5, placed above the second pair of belts 12, to count them while passing thereunder.

This operation is aimed at supplying information concerning the number of articles transferred to the inlet section 21 of the conveying path 2 to an electronic unit (not shown) for managing the temporary storing device, in the way that will be explained later on.

The second part of the temporary storing device includes a work plane P, in which a conveying path 2 is formed for the articles A in the following way.

The work plane P is elongated to obtain more storage room and is horizontal. The work plane is composed of a series of side by side spaced out segments, which leaves a series of longitudinal grooves between them.

The way in which the segments are joined to one another is not disclosed because is not relevant to the invention and is within reach of any person skilled in the art.

By way of example, the segments can be joined at their ends, either below or beside the level of the work plane.

Within each groove, from end to end, there is disposed a flexible metal band 70, which is narrower that the groove by a difference equal to twice the diameter of the articles A.

The band 70 is supported at both ends of the relevant groove and is centered with respect thereto, so as to leave at both sides a space as wide as the diameter of the articles A.

This way, a plurality of longitudinal parallel tracks 60 are defined across the work plane, and the first track, the one situated closer to one longitudinal side of the work plane, forms the inlet section 21.

The transferring means 1, and in particular the second pair of belts 12, are placed in alignment with the first track.

In the example shown there are two grooves and two couples of tracks 60. A further track 60 is made at the longitudinal side of the work plane opposite to the inlet section 21.

The last track forms a final straight section 24 ending with an outlet section 28 at the side of the work plane 8 facing the second machine, i.e. the downstream side.

At the side facing the first machine, i.e. the upstream side, of the work plane, the tracks 60 are joined in pairs by outer joining curved section 27. The outer joining curved sections 27 are situated at, and supported by, the ends of the relevant segments of the work plane. The first track, which is also the first track of the first pair of tracks, is left free, as it can be seen in FIGS. 1 and 2.

Then, the second track of each pair of tracks is connected to the first track of the subsequent pair of tracks, and so on. The second track of the last pair of track is joined to the last track, that is, the track closer to the longitudinal side of the work plane corresponding to the outlet section 28.

Along each groove there is also placed a moving carriage 71. The carriage 71 is guided in a known way, which is not disclosed nor illustrated as it is not relevant to the invention, for instance by means of grooved guides made in the internal sides of the grooves of the work plane. There are as many carriages 71 as the number of grooves.

Figure 6:
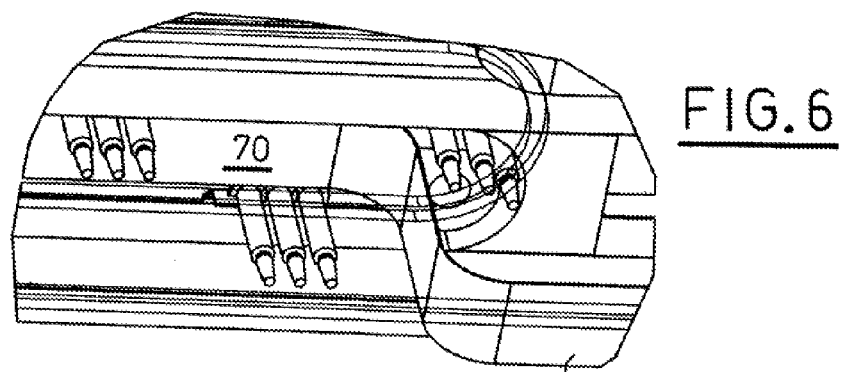
FIGS. 6 and 7 are perspective views, respectively from the bottom and from the top, and enlarged with respect to the FIGS. 1 and 2, further constructive particulars of the dynamic temporary storing device, proposed by the present invention.

Each moving carriage 71, as well shown in FIG. 6 and in FIG. 7, has means at both ends, not shown for sake of simplicity of the drawings, to make the flexible band 70 turn downward, and then to set it horizontal again, so that it extends horizontally below the carriage. This can be easily seen in FIG. 6

The carriage 71 moves longitudinally along the work plane P, along the grooves, in opposite movement directions. During the movement of the carriage 71, the portions of the flexible band 70, which extend in the carriage movement direction, is progressively folded and lowered under the carriage, so as to allow the latter to move.

Then, at the trailing end of the carriage, the flexible band is progressively brought back to the level of the work plane P. This way, the length of the flexible band situated before and after the carriage change in opposite directions, that is, when the upstream band section length increases, the downstream band section length decreases, and vice versa.

Figure 7:
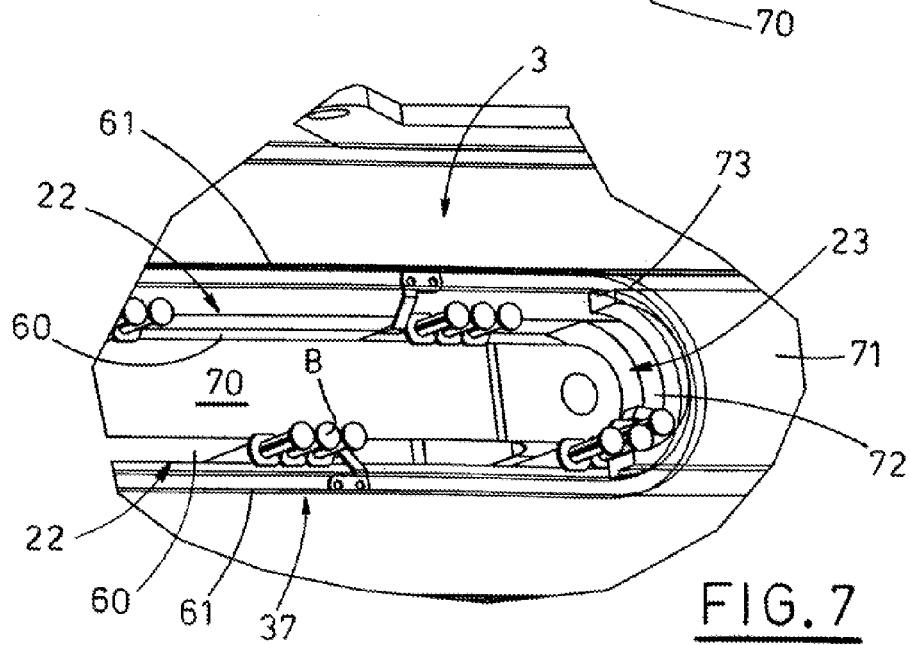

The side of each carriage facing the inlet section 21, say the carriage upstream side, supports first curved edge elements 72 shaped in such a way as to join the two facing track intermediate straight sections 22, so as to form inner curved sections 23 (see FIG. 7).

In this way, a closed conveying path 2 for the groups B of articles A is obtained starting from the inlet section 21 up to the outlet section 28.

The length of the tracks intermediate straight sections 22 delimited by the carriage is varied by sliding of the carriage 71, so that also the overall length of the conveying path 2 changes accordingly.

The same work plane P has also a plurality of second longitudinal parallel tracks 61, formed by a step-like configuration featured along the internal upper border of the grooves, and in general of the tracks 60.

The second tracks 61 are joined in pairs to each other by the same outer joining curved sections 27 joining also the tracks 60 at the first machine facing side of the work plane P. In particular, as it will be clear from the following detailed description, joining of the second tracks 61 is obtained by curved edge elements associated to, and concentric with, the outer joining curved sections 27.

The carriages 71, on one side, and the first machine facing side of the work plane, on the other side, delimit upstream or intermediate straight sections 38 of the second tracks 61.

Each moving carriage 71 supports also, at its upstream side, facing the intermediate sections 38, a second curved edge element 73, outer with respect to the first curved edge elements 72. The second curved edge element 73 joins the intermediate sections 38 of the relevant second tracks 61.

The second curved edge elements 73 carried by the carriages are substantially alike the outer curved edge elements associated to the outer curved joining sections 27 at the first machine facing side of the work plane.

The last second track 61, corresponding to the final straight section 24 of the conveying path 2, forms a final straight section 380 ending at the outlet section 28.

Therefore, the second tracks 61, in particular the intermediate straight sections 38, the second curved edge elements and the final straight section 380 all together form a guiding path 37, which is closed, in a loop, by an inoperative guiding path 39 formed in the work plane P side facing the second machine, the same way as at the side facing the first machine. Accordingly, the ends of the second tracks 61 facing the second machine are joined by edge elements as at the first machine facing side of the work plane, and the second machine facing sides of the carriages 71 have second curved edge elements exactly alike the ones provided at the first machine facing side of the same carriages.

In particular, according to the example shown in the enclosed Figures, the above mentioned second inoperative guiding path 39 of the flexible element 32 includes a plurality of intermediate straight sections, aligned with corresponding intermediate straight sections 38 of the first guiding active path 37, which are joined together by relative curved sections, and a final straight section, which joins with the first of the intermediate straight sections 38 in the region of the inlet section 21.

Into the closed loop guiding path 37 plus 39 there is placed an endless flexible driving element 32, for example a belt or a chain, provided with side protruding lugs 31, which are arranged crosswise to the tracks and spaced out by a prefixed pitch. The side protruding lugs 31 extend above the closest relevant track, just enough to cross it side to side. In the following, reference will be made to a belt only, as an example.

At the inlet section 21 and at the outlet section 28, the belt 32 is mounted on respective driving pulleys namely a first driving pulley 40 and a second driving pulley 41.

The two pulleys are both powered but are operated independently from each other, so that while either one is operated, the other can remain motionless.

Practically, the carriages and the belt 32 form a kind of tackle, in which pulling either one side of the "rope" (belt) or the other one, the wheels (carriages 71) are moved in either a corresponding direction or in the opposite one.

This makes power means for moving the carriages unnecessary, as they move automatically in accordance to the needs, by traction of the driving belt 32.

Operation of the temporary storage device is as follows.

During regular operation, articles A are gathered along a short sloping conveyor (not shown) connecting the first (manufacturing) machine with the first part of the claimed device.

The extension of the sloping conveyor is not enough to provoke dangerous stresses on the foremost articles A, for example syringes.

The first pair of belts 11 takes the articles from the sloping conveyor and forward them in a short horizontal row, up to the second pair of belts 12.

The belts 12 of the second pair are operated faster, so they take one article A and accelerate it, separating it from the row. While passing under the detector 5, the articles are counted, this operation being easily performed since the articles are spaced out. Then the articles are again gathered at the inlet section 21.

In the shown example, referred to the syringe case, the tracks 60 receive the tubular body thereof, while the syringe collars rest slidingly on the work plane P and the band 70.

The belts of the first pair 11 are moved at constant speed, as well as the belts of the second pair 12, though faster.

All carriages 71, two in the shown example, but the number can be any, are moved as close as possible to the first machine facing side of the work plane P, so that the conveying path is as short as possible.

When a selected number of articles A have been gathered, for instance three as in the shown example (see FIGS. 1, 2, 5 to 7), a group B is formed and the driving element 32 (longer belt) is operated by the control unit (not shown).

The first driving pulley 40 and second driving pulley 41 are operated synchronously, that is both are operated one step.

The lug 31 crossing the inlet section 21 moves the group B forward one step, long as the distance between two lugs 31, then the driving element 32 is stopped again.

When another group B including three articles A is formed at the inlet section, the driving element 32 is operated another step. When, in normal operating condition, the conveying path 2 is completely full of groups B of articles A, each step of the driving element a group B is also transferred from the outlet section 28 to a downstream short sloping conveyor (not shown) leading to the second (packaging) machine.

Therefore, the detecting means 5 are responsible for activation of the moving means 3, by means of the electronic unit for managing the temporary storing device, that is they enable the moving means and make them pass through the inlet section 21 upon completion of a group B of articles with a number of articles corresponding to the particular processing needs of the moment, as will be explained in the following.

When a short time stop of the second machine occurs, the control unit detects it and raises the number of articles A making up each group B, for instance four articles.

Obviously, the time necessary to form the increased group is longer and groups of articles will be transferred to the downstream conveyor at longer times.

Meanwhile, the number of articles present within the temporary storing device increases too, absorbing the temporary overload.

When the second machine operation is resumed, for instance after changing an empty band reel, the number of articles in each group is decreased, either to the pre-set value, in this case three, or temporarily to a lower number, for instance two. The groups will be formed faster and the driving element operated more often, so that articles are transferred to the downstream conveyor quicker, that is, in larger number in a same time interval. Obviously, the second machine operates faster in this transition time, until the number of articles present within the temporary storing device gets lower.

If the number of articles for each group was decreased beyond the pre-set one, the pre-set number of articles is restored and normal operation continues.

Figure 4:
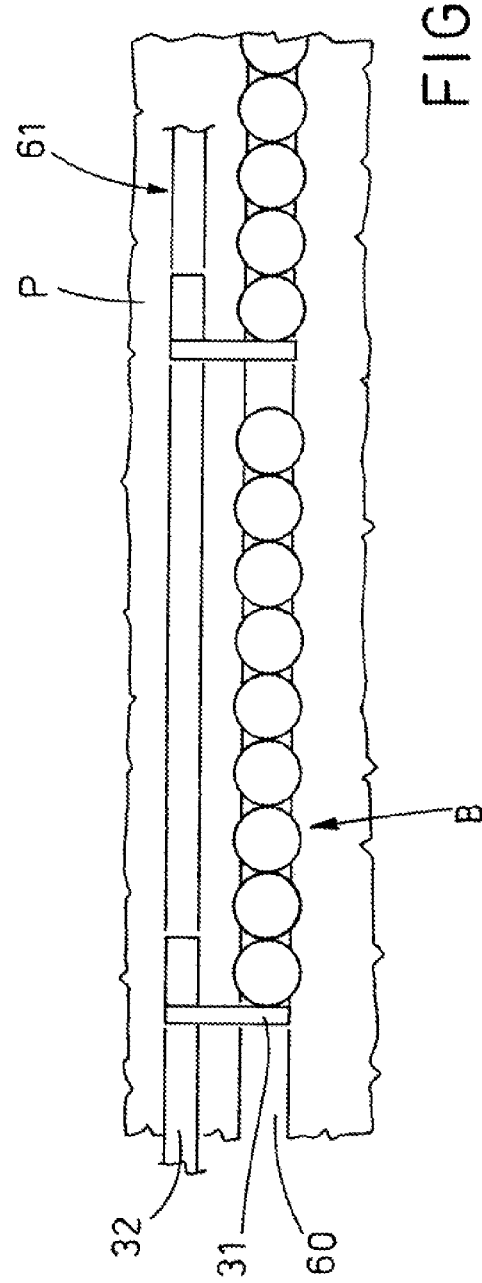

Depending on the case, the number of articles gathered in each group can be increased up to a maximum that in the shown example has been fixed to nine, and decreased down to one. In this respect, reference is made to FIGS. 3 and 4, where the minimum condition and the maximum condition are respectively shown.

In case the stop time prolongs beyond the expected one, for instance the second machine has a jam problem requiring longer stop, after increasing the number of articles for each group B to the maximum, for instance nine, the second part of the temporary storing device intervenes stopping rotation of the second driving pulley 41.

In this way, no groups of articles are any more transferred to the downstream conveyor, that is, to the packaging machine.

The pulling action performed by the first driving pulley 40 on the inactive driving element 32 and acting on the second machine facing side of the carriages 71, makes these to move away from the first machine facing side of the work plane, thus increasing the length of the active portion of the conveying path 2. Accordingly, the inlet groups B of articles are stored along the conveying path getting longer and longer as the first driving pulley 40 rotates while the second driving pulley 41 is kept motionless.

In this context, the actions of the two parts of the temporary storing device are summed up, so that a larger number of articles are included in each group B and more groups B can be gathered with the device.

In all cases, the articles are not disposed along sloping tracks, so that in no way do the articles have to support the weigh of a long row of article resting against them.

When the second machine operation is resumed, the operation of the temporary storing device is reversed, and the second driving pulley 41 is operated at a faster rate with respect to the first driving pulley 40, so that the storing device is progressively emptied while the carriages 71 are moved back toward the first machine facing side of the work plane P, due to the traction action of the second driving pulley 41 on the active portion of the driving element 32 (belt) acting on the first machine facing sides of the carriages 71 by means of the second curved edge elements 73.

Also the number of articles per group is decreased as in the example mentioned before.

When the normal operating condition is restored, the device continues working normally.

Many possible variations of the operation are possible. The driving pulleys 40 and 41, training the driving element 23, can be operated according to different patterns, in different times in accordance with a possible software program stored in the control unit, taking into consideration that changes in the conveying path 2 are determined by the difference of rotation between the two pulleys.

Also, rather then operating the driving pulleys 40, 41 with different steps, they can be operated with different speeds during equal times, which brings to the same results with other phase relationships between them.

It must also be considered that, on the other end, changing the length of the conveying path, instead of varying the number of products for each group means also a longer time for the product to stay within the temporary storing device, which is not desirable in most cases.

Therefore, shorter time stops must be preferably be compensated by activating the first part of the device rather then the second one.

According to another variation, operation time of the driving belt could be determined by a timer switch, instead of the detection means 5 for counting the articles.

The capability of the temporary storing device 100, proposed by the invention, to change dynamically the number of articles present in the groups B of articles, picked up from the inlet section 21 by the moving means 3, and the capability to change also the total number of articles, which can be stored along the conveying path 2, by changing the length of the intermediate straight sections 22, makes the device extremely versatile and flexible, and ready to comply to the changes of the production rates of second machine.

Therefore, the dynamic temporary storing device 100, proposed by the invention, on the basis of what has been described above, transfers the articles from the first machine to the second machine in a simple and efficient way, moving distinct and consecutive groups of articles, instead of a long and continuous row along a sloping track.

This particular way of conveying reduces first of all the reciprocal shoves between the moving articles, thus reducing the number of possible faulty or damaged articles, and then, it reduces the stay of the articles long the conveying path.

Further, the dynamic temporary storing device 100 is extremely flexible and versatile, adapting rapidly to possible changes of production speed of second machine.

What above has been obtained due to the possibility to change the total number of articles present along the conveying path.

The total number of temporary stored articles can be changed either by changing the number of articles present in each group of articles, which is picked up from the inlet section of the conveying path, or by changing, increasing or reducing, the length of the intermediate straight sections 22 of the conveying path 2.

Naturally, the above invention has been described with reference to the enclosed figures as a pure, not limiting example; therefore it is obvious that all the modifications or variants suggested by its use, as well as implementation remain within the scope defined by the following claims.

What is claimed is:

1. A dynamic temporary storing device for articles, such as syringes or the like, the device being designed for interposition between an outlet of a first machine and an inlet of a second machine, so that the device receives articles from the outlet of said first machine and supplies received articles to the inlet of said second machine, the device including:
- an article conveying path, with an inlet section for receiving articles from the first machine, and an outlet section to supply articles to the second machine;
- transferring means for transferring articles received from the outlet of said first machine to said inlet section, where the articles are gathered to form groups of articles;
- articles driving means associated to said conveying path and passing through said inlet section when each group of articles is formed for moving the articles along said conveying path up to said outlet section;
- the number of articles included in each group being adjustable, so that, during operation of the temporary storing device, the number of articles supplied to the second machine can be dynamically changed in relation to a change of operation rate of said second machine.

2. A temporary storing device, according to claim 1, wherein said article transferring means include a first pair of side-by-side endless belts for transferring a row of articles coming from said first machine, and a second pair of side-by-side endless belts, next to said first pair of endless belts and operated faster than said first pair of belts to take single articles and transfer them, spaced out, to the inlet section of the conveying path, where groups of articles are formed.

3. A temporary storing device, according to claim 2, wherein a terminal part of the first pair of belts overlaps an initial part of said second pair of belts, so as to ensure continuous transferring of the articles.

4. A temporary storing device, according to claim 2, including detecting means associated to said second pair of belts for counting said articles being transferred by the second pair of belts, from said first pair of belts to said inlet section of the conveying path, to form said groups of articles.

5. A temporary storing device, according to claim 1, wherein said conveying path is formed on a work plane having a first machine facing side and a second machine facing side, said conveying path including, beginning from said inlet section, a first plurality of intermediate straight abreast sections, joined together by respectively, a related first series of inner curved sections and outer curved sections, and a final section joined, by an outer joining curved section, to the last intermediate straight portion of the intermediate straight sections, and which final section ends at said outlet section, with said groups of articles being conveyed by said driving means along said conveying path so as to be transferred from the inlet section to the outlet section, and consequently to said second machine.

6. A temporary storing device, according to claim 5, wherein said first intermediate straight sections is adjustable dynamically during operation of said temporary storing device, so that total articles present along said conveying path, between said inlet section and said outlet section, can be changed in number in relation to changes of the operation rates of said second machine.

7. A temporary storing device, according to claim 6, wherein the length of said intermediate straight sections is increased as a consequence of a sudden stop of said second machine, so that articles coming from said first machine are stored in the temporary storing device along such intermediate straight sections, whose length is progressively increased during said second machine stop.

8. A temporary storing device, according claim 5, wherein said work plane has a plurality of first longitudinal, parallel tracks, which define said first intermediate straight sections and said final section of the conveying path, and a plurality of second parallel tracks running beside said first longitudinal tracks and defining straight sections of said guiding path.

9. A temporary storing device, according to claim 8, wherein at least one pair of said tracks is obtained by disposing a flexible bands into a longitudinal groove made in the work plane, leaving at both sides of said band a space as wide as the diameter of said articles, and providing a movable carriage sliding along the groove while the band is folded under the carriage so that between the carriage and the first machine facing side of the work plane intermediate straight sections are delimited, these intermediate straight sections changing in length in accordance with the motion of the carriage in either one direction or another opposite direction.

10. A temporary storing device, according to claim 9, wherein each carriage, at an inlet section facing side, has an inner curved sections for supporting first curved edge elements forming said first inner curved sections of the conveying path.

11. A temporary storing device, according to claim 10, wherein said work plane includes also a guiding active path for the driving means, following, with an active section, a pathway similar to the pathway of the conveying path and being situated beside the conveying path, thus defining second straight sections of said guiding path parallel to said intermediate straight sections of said conveying path, and an inactive guiding path closing the active guiding path to form a closed loop for a driving means sliding inside said active guiding path and inactive guiding path.

12. A dynamic temporary storing device, according to claim 11, wherein said carriage supports also, second curved edge elements at both carriage sides facing the inlet section and the outlet section, the second curved edge elements joining the intermediate straight sections of said guiding path, on the carriage side facing said inlet section, and the second tracks on the carriage side facing the outlet section, a first driving pulley being situated at said inlet section while a second driving pulley is situated at the outlet section, so that said driving means is looped around the first driving pulley, the second curved edge elements on the inlet section facing side of each carriage, the second driving pulley and then the second curved edge elements on the outlet section facing side of each carriage.

13. A dynamic temporary storing device, according to claim 12, wherein, by difference rotation steps for the first driving pulley and the second driving pulley the carriage or carriages are moved by said driving means.

14. A dynamic temporary storing device, according to claim 1, wherein said driving means include an endless, driving flexible element, with side protruding lugs, distanced by a prefixed pitch and protruding crosswise to pass above the conveying path, to drive the articles, or groups of articles, due to rotation of the driving pulleys.

15. A dynamic temporary storing device, according to claim 1, wherein said driving means are activated by operation of said driving pulleys when a group of articles is formed at the inlet section.

16. A dynamic temporary storing device, according to claim 1, wherein said driving
flexible element (32) is a belt or a chain.

* * * * *